(12) United States Patent
Blackburn (10) Patent No.: US 9,625,082 B2
(45) Date of Patent: Apr. 18, 2017

(54) SIMULTANEOUSLY FOLDABLE MULTI-SCREEN MONITOR ARM DEVICE

(71) Applicant: InterMetro Industries Corporation, Wilkes-Barre, PA (US)

(72) Inventor: Nicholas Leonard Blackburn, Wellesley (CA)

(73) Assignee: TOUCHPOINT MEDICAL, INC., Concordville, PA (US)

( * ) Notice: Subject to any disclaimer, the term of this patent is extended or adjusted under 35 U.S.C. 154(b) by 0 days.

(21) Appl. No.: 14/057,620

(22) Filed: Oct. 18, 2013

(65) Prior Publication Data

US 2014/0117182 A1 May 1, 2014

Related U.S. Application Data

(60) Provisional application No. 61/718,511, filed on Oct. 25, 2012.

(51) Int. Cl.

| F16M 13/00 | (2006.01) |
|---|---|
| F16M 11/18 | (2006.01) |
| F16M 11/20 | (2006.01) |
| F16M 11/24 | (2006.01) |
| A47F 5/00 | (2006.01) |
| A47H 1/10 | (2006.01) |
| F16M 11/00 | (2006.01) |
| A47F 5/12 | (2006.01) |

(52) U.S. Cl.
CPC ......... *F16M 11/18* (2013.01); *F16M 11/2014* (2013.01); *F16M 11/24* (2013.01)

(58) Field of Classification Search
CPC ........ F16M 11/04; F16M 11/38; F16M 11/08; F16M 11/10; F16M 11/12; F16M 11/2014; F16M 11/2092; F16M 11/24; G06F 1/1601
USPC ........ 248/298.1, 309.1, 299.1, 169, 171, 93, 248/919, 276.1, 284.1, 277.1, 274.1, 248/282.1, 292.12, 422, 125.7, 131
See application file for complete search history.

(56) References Cited

U.S. PATENT DOCUMENTS

| 4,620,808 A * | 11/1986 | Kurtin ........................ B41J 3/46 |
|---|---|---|
| | | 248/282.1 |
| 6,695,270 B1 * | 2/2004 | Smed ..................... F16M 11/04 |
| | | 248/274.1 |
| 7,188,812 B2 * | 3/2007 | Wang ..................... F16M 11/04 |
| | | 248/276.1 |
| 7,398,950 B2 * | 7/2008 | Hung ..................... F16M 11/10 |
| | | 248/276.1 |
| 7,571,883 B2 * | 8/2009 | Van Groesen ......... F16M 11/04 |
| | | 248/123.11 |

(Continued)

*Primary Examiner* — Jonathan Liu
*Assistant Examiner* — Muhammad Ijaz
(74) *Attorney, Agent, or Firm* — RatnerPrestia (57) ABSTRACT

A simultaneously foldable multi-screen monitor support having separate support arms connected to separate posts extending from a base. The posts are mounted on end sections of the base and are pivotable about a center section. When one post is moved between a first position and a second position, the other post simultaneously moves between a third position and a fourth position. The movement of one post moves the other post and monitors that are supported on the posts are moved in the same manner from a folded position to an operating position or vice versa.

8 Claims, 9 Drawing Sheets

(56) References Cited

U.S. PATENT DOCUMENTS

| | | | |
|---|---|---|---|
| 8,282,052 B2 * | 10/2012 | Huang | F16M 11/045 248/125.1 |
| 2003/0015632 A1 * | 1/2003 | Dunn | A47B 1/065 248/122.1 |
| 2006/0186294 A1 * | 8/2006 | Van Groesen | F16M 11/04 248/284.1 |
| 2007/0205340 A1 * | 9/2007 | Jung | F16M 11/24 248/125.9 |
| 2009/0084913 A1 * | 4/2009 | Grabania | F16M 11/04 248/176.3 |
| 2011/0000136 A1 * | 1/2011 | Brun | E05D 3/06 49/358 |

* cited by examiner

SIMULTANEOUSLY FOLDABLE MULTI-SCREEN MONITOR ARM DEVICE

CROSS-REFERENCE TO RELATED APPLICATION

This application claims priority from U.S. Provisional Patent Application No. 61/718,511, filed Oct. 25, 2012, the disclosure of which is hereby incorporated by reference in its entirety.

BACKGROUND OF THE INVENTION

Field of the Invention

This invention relates to a simultaneously foldable multi-screen monitor support and more particularly to a monitor support having two or more monitors mounted on separate support arms that are movable between a folded position and an operating position. When one monitor on one support arm is moved between the folded position and the operating position, the other arm simultaneously moves between the same two positions for the other arm.

Description of the Prior Art

Monitor supports for two or more monitors are known. The Chih U.S. Patent Application Publication No. 2008/0225472 describes a dual display device in which the monitors move apart from one another or toward one another. The monitors are mounted on a single post.

The Jeong U.S. Pat. No. 7,529,083 describes a monitor support apparatus in which two monitors are mounted on support arms extending from a single post.

SUMMARY OF THE INVENTION

It is an object of the present invention to provide a monitor support that has monitors supported on it, and a plurality of posts that each extend from a base, the monitors being movable simultaneously from a first position to a second position by moving one of the monitors.

A support for at least two monitors comprises a base, the base having a center section and two end sections pivotally connected thereto. The center sections and two end sections have gears therein that are arranged to interact with one another to pivot the end sections relative to the center section in a synchronous manner. The end sections each have a post mounted at or near a free end thereof, the post extending upward from the free end of each end section. There are two posts, each post having a support arm movably mounted thereon, each support arm having a monitor mounted thereon. The gears interact so that when one of the posts is moved from a first position to a second position, the other post simultaneously moves from a third position to a fourth position.

In the arrangement of gears shown in the drawings, when one post is pivoted clockwise, the other post pivots by an equal distance or angle counterclockwise and vice versa. In a further embodiment, a support can have more than one monitor mounted on each post. Additional monitors can be mounted on additional support arms or on a single support arm on each post.

There are many uses for the monitor support of the present invention. One use occurs when the monitor support is mounted on a wheeled cabinet or other mobile device. When it is desired to use the monitors, the monitor support can be moved to the operating position, preferably, when the wheeled cabinet or other mobile device is stationary. When the wheeled cabinet is about to be moved to a new location, the monitors can be returned to the folded or storage position. For example, in hospitals or other health care facilities, computer processors or monitors are often mounted on a movable device or platform and move from room to room. During transit from room to room, the monitors are preferably moved to the folded or storage position to protect the monitors from damage. Also, it is much easier and more efficient to wheel the monitors through doorways and hallways when the monitors are in a folded position. Further, when a user has multiple monitors on a stationary work surface, the user may wish to have the ability to easily move the monitors from an operating position to a folded or storage position when the monitors are not being used in order to create additional space on the work surface.

While it is not shown in the drawings, while a preferred operation is for the gears to move the monitor supports in opposite directions, the gears can be designed to move the monitor supports in the same direction where that result is desirable.

BRIEF DESCRIPTION OF THE DRAWINGS

Throughout the drawing figures, the same reference numbers are used for those components that are identical.

DETAILED DESCRIPTION OF AN EMBODIMENT

Figure 1:
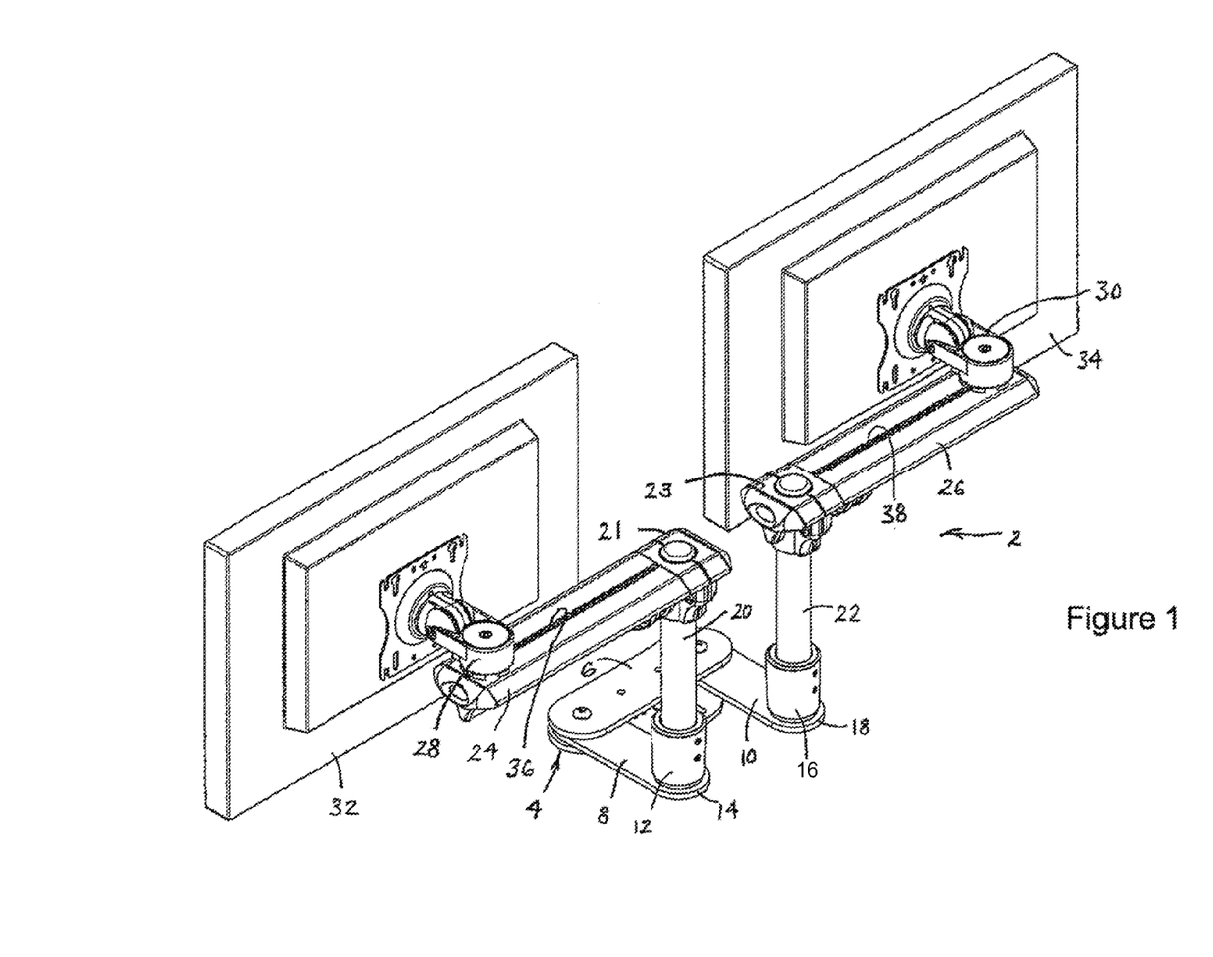
FIG. 1 is a perspective view of a monitor support in an operating position when viewed from the rear.
Figure 2:
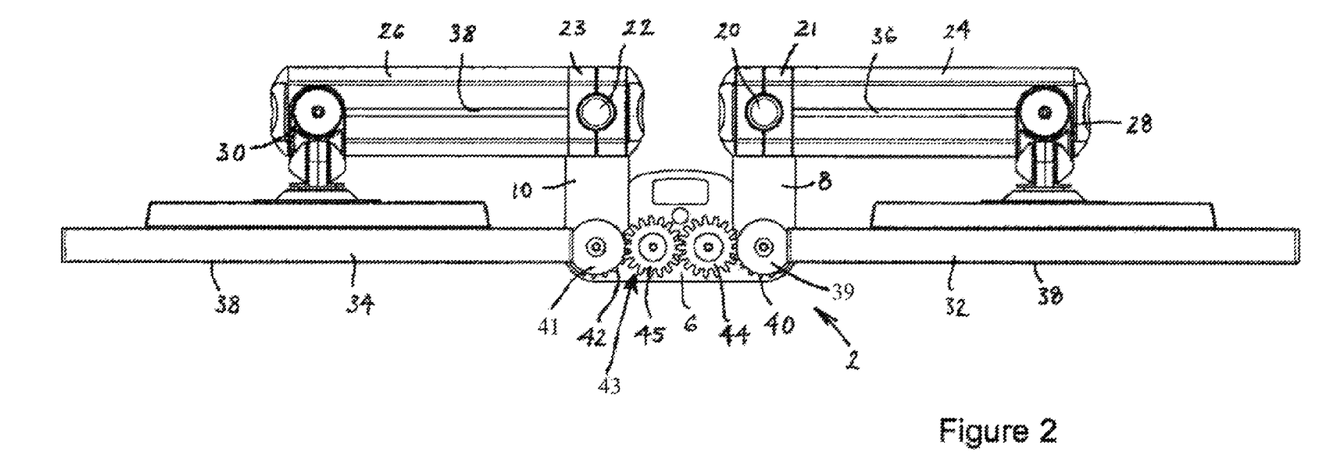
FIG. 2 is a partial top view of the monitor support in the operating position.

In FIGS. 1 and 2, a monitor support 2 has a base 4 with a center section 6 and a first arm or end section 8 and a second arm or end section 10. End sections 8, 10 have first and second receptacles or inserts 12, 16, respectively. The first and second inserts 12, 16 are located at or near first and second free ends 14, 18, respectively, of the end sections 8, 10. Posts 20, 22 are mounted in the inserts 12, 16 and extend upward from the end sections 8, 10, respectively.

Monitor arms 24, 26 are movably mounted on the posts 20, 22, respectively, by clamp members 21, 23. That is, heights of the monitor arms 24, 26 are independently adjustable by moving along longitudinal axes of the posts 20, 22. Mounting brackets 28, 30 connect the mounting arms 24, 26 to monitors 32, 34, respectively. The mounting brackets 28, 30 may be of conventional design, so as to allow the monitors 32, 34 to be independently adjusted in vertical and horizontal planes. Each mounting bracket 28, 30 is connected to a mounting arm 24, 26 in a T-shaped channel 36, 38, respectively. The monitor mounting brackets 28, 30 may be of conventional construction and allow the monitors to be moved vertically and horizontally relative to the monitor arms 24, 26 to which they are connected. The monitors 32, 34, as shown in FIGS. 1 and 2, are in an operating position, being mounted beside one another with a front 38 of each monitor 32, 34 facing outward and forward.

In FIG. 2, it can be seen that the end sections 8, 10 have first and second geared ends 39, 41 with gears 40, 42, respectively, at an inner end thereof and that there is a gear set 43 including two circular shaped gears 44, 45 located between the gears 40, 42 in the center section 6.

Figure 3:
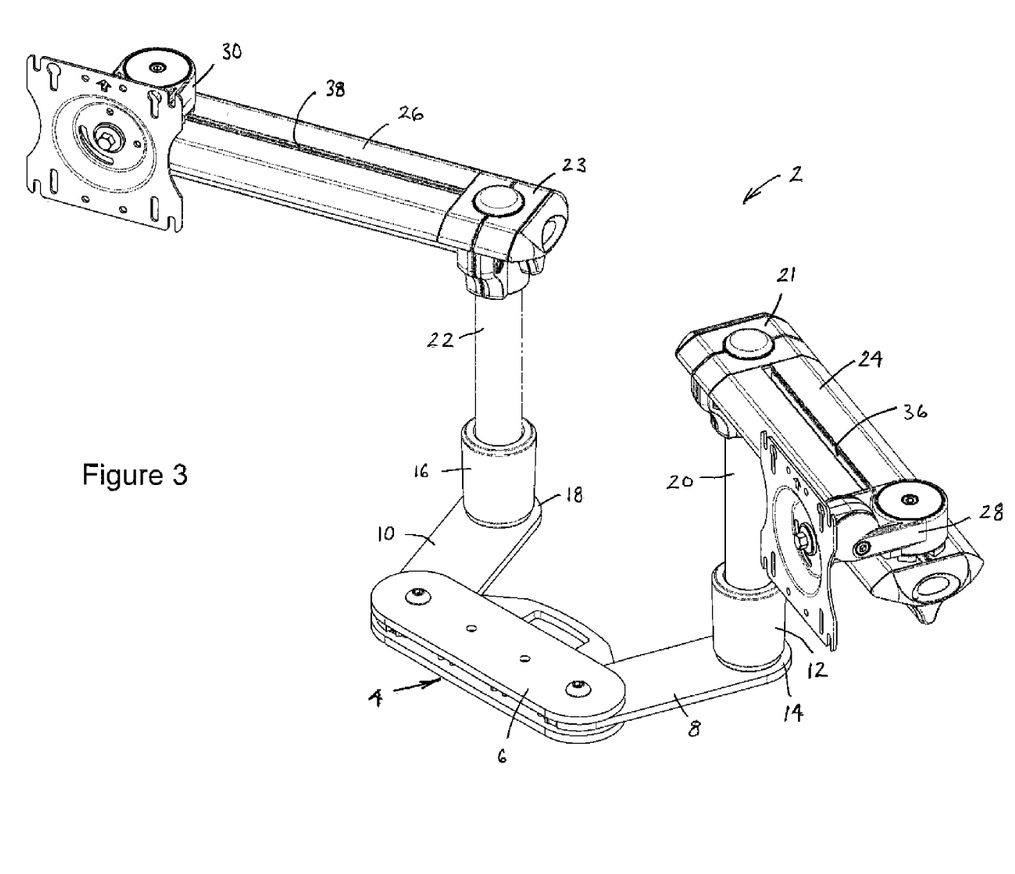
FIG. 3 is a partial perspective view of the monitor support when viewed from the rear in a slightly folded position.

In FIG. 3, the monitor arms 24, 26 are angled slightly toward one another as the end sections 8, 10 are angled slightly outward from one another. This would place the monitors in an operating position that is slightly different than the operating position of the monitor shown in FIGS. 1 and 2, where the end sections 8, 10 are substantially perpendicular to the center section 6.

Figure 4:
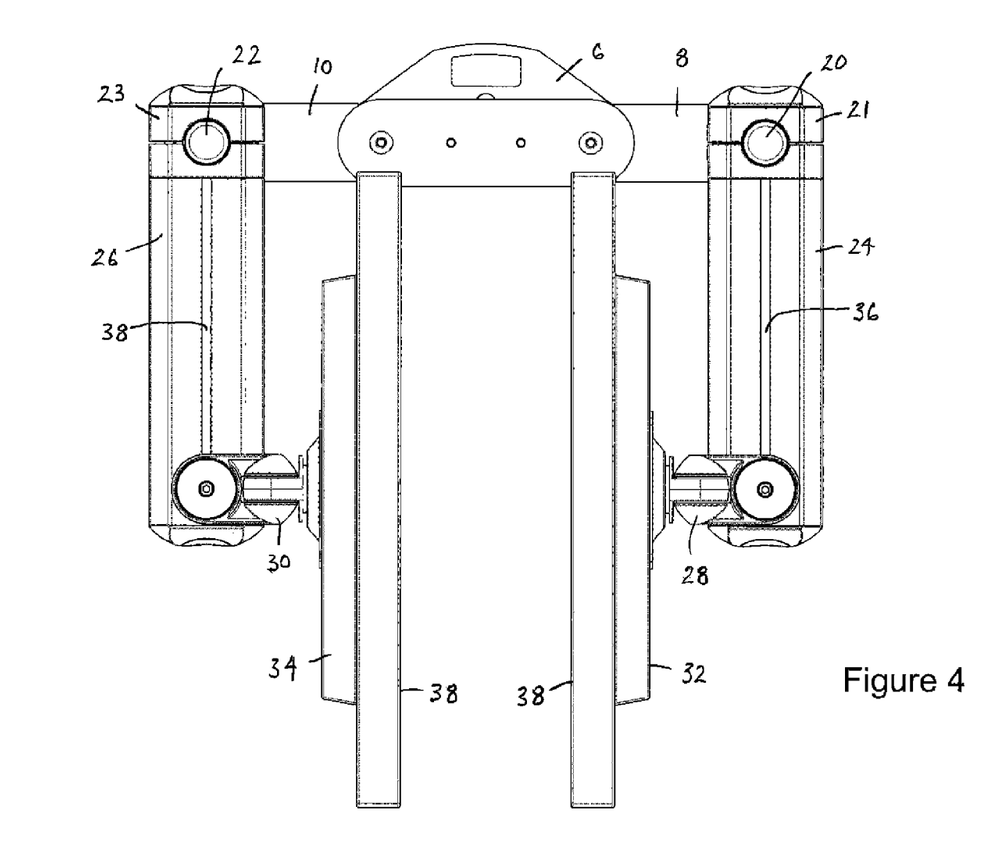
FIG. 4 is a top view of the monitor support in a folded position.

In FIG. 4, the monitors 32, 34 are shown to be in a folded or storage position with the end sections 8, 10 being substantially parallel to the center section 6 and the monitors 32, 34 facing one another. The posts 20, 22 are in first and third positions, respectively, when in the storage position.

Figure 5:
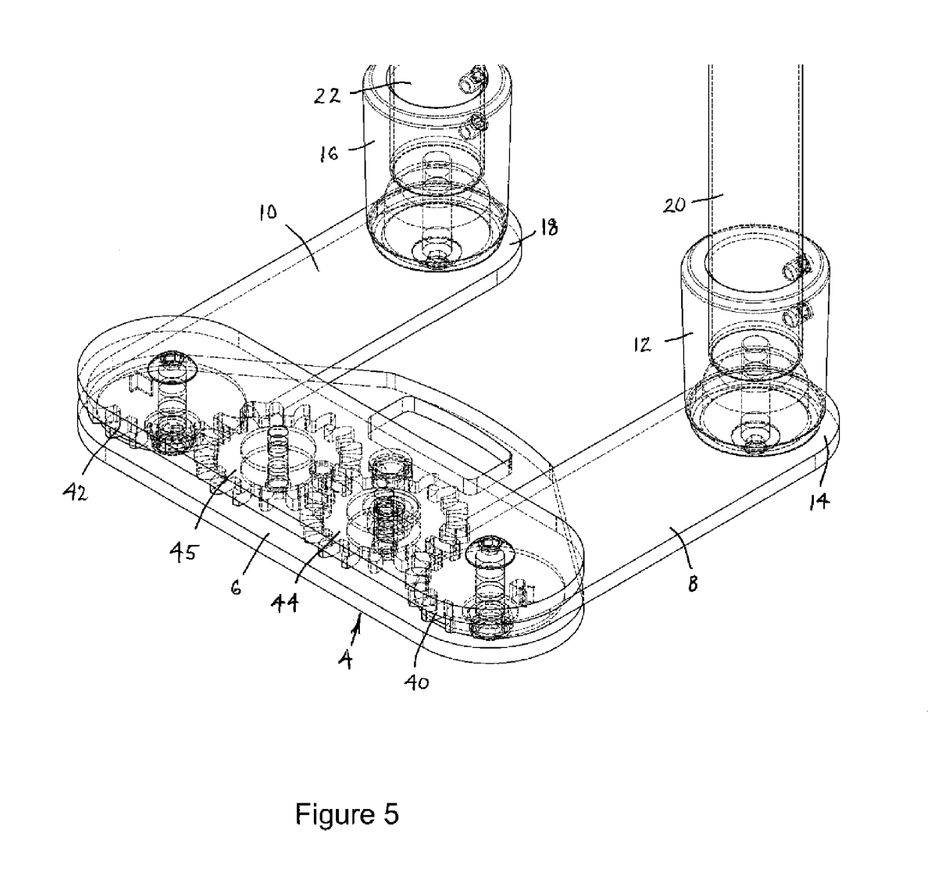
FIG. 5 is a partial perspective view of a base in an operating position with gears exposed.

In FIG. 5, there is shown an enlarged perspective view of the gears 40, 42 of the end sections 8, 10 and two circular gears 44, 45 located between gears 40, 42. It can be seen that the gears 40, 42 are integral with the end sections 8, 10, in this example being integrally formed with the end sections 8, 10. The four gears 40, 42, 44, 45 are pivotally mounted in the center section 6 to interact with one another. A cover 46 of the center section 6 may be transparent to expose the gears 40, 42, 44, 45, if desired.

In FIG. 5, the end sections 8, 10 are in the operating position relative to the center section 6, and the posts 20, 22 are in second and fourth positions, respectively. As the end section 8 is manually pivoted in a clockwise direction toward the storage position when viewed from the top, the gear 40 will interact with the gear 44, which in turn interacts with the gear 45, which in turn interacts with the gear 42 to cause the end section 10 to pivot counter clockwise. The gears 44, 45 are identical to one another and it will be understood that the end section 10 alternatively could have been pivoted in the counter clockwise direction to cause the end section 8 to pivot in the clockwise direction toward the storage position.

Figure 6:
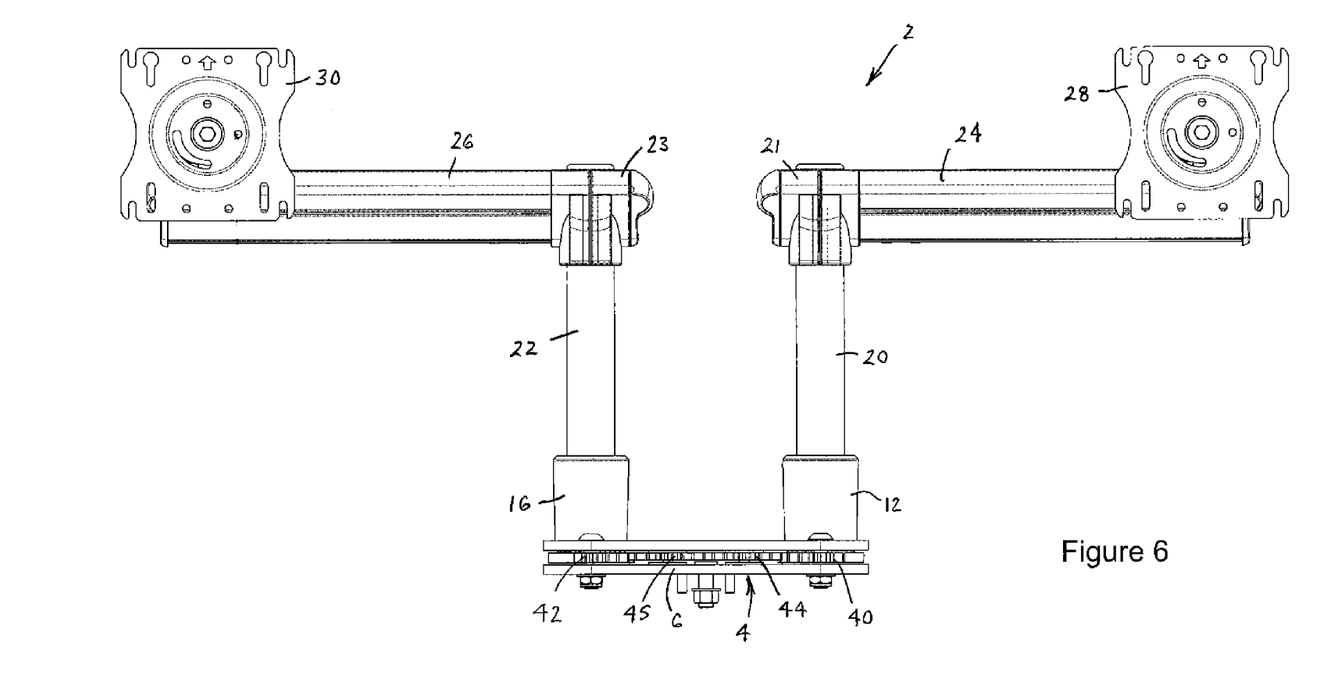
FIG. 6 is a front view of the monitor support in an operating position.
Figure 7:
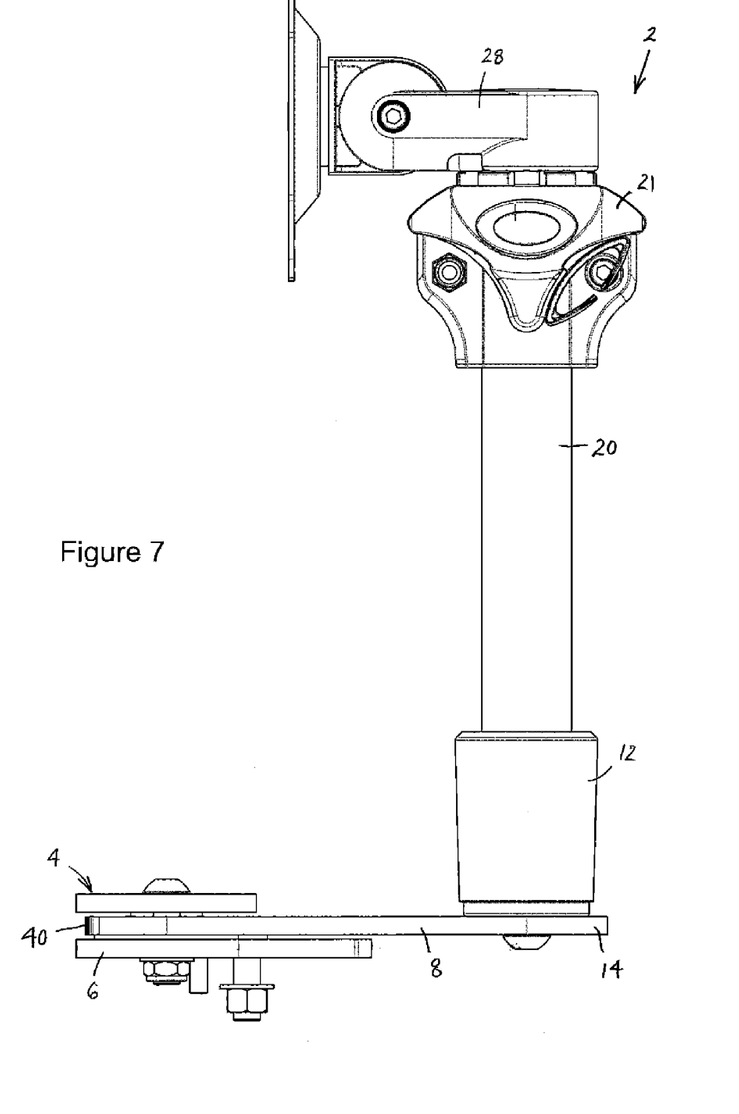
FIG. 7 is a side view of the monitor support of FIG. 6.
Figure 8:
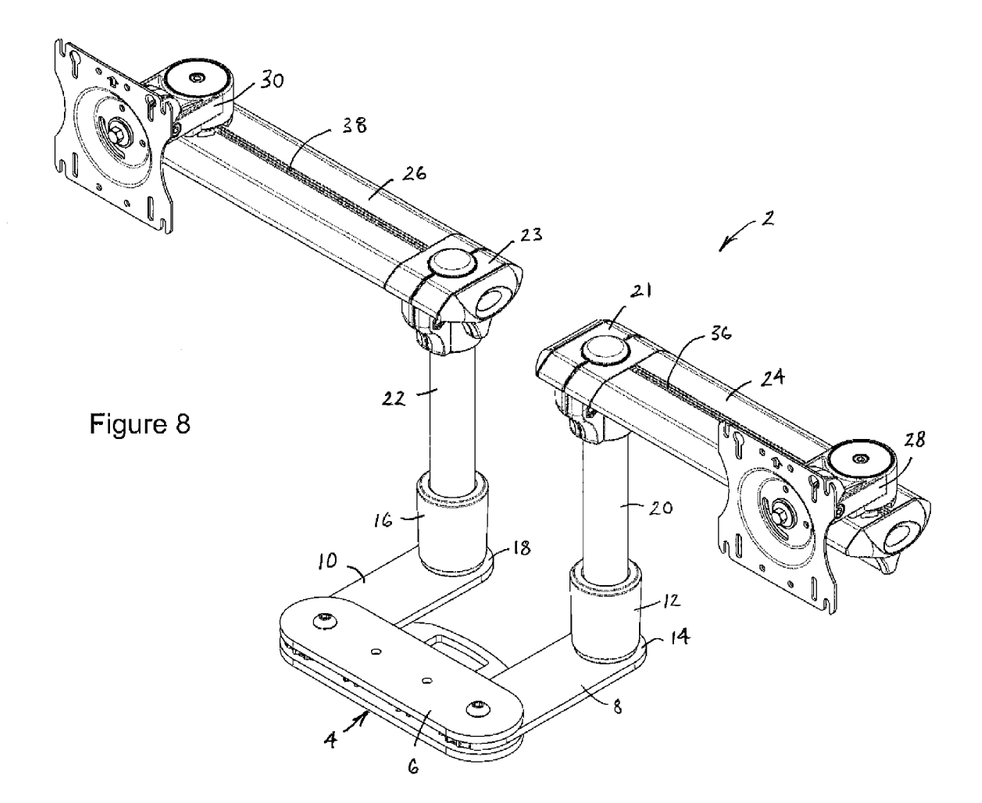
FIG. 8 is a perspective view, when viewed from the front of the monitor support of FIG. 6.

FIGS. 6 to 8 show additional views of the monitor support 2, including optional mounting hardware extending from a bottom of a lower member 48 of the base 4 for mounting the monitor support 2 to a work surface.

Figure 9:
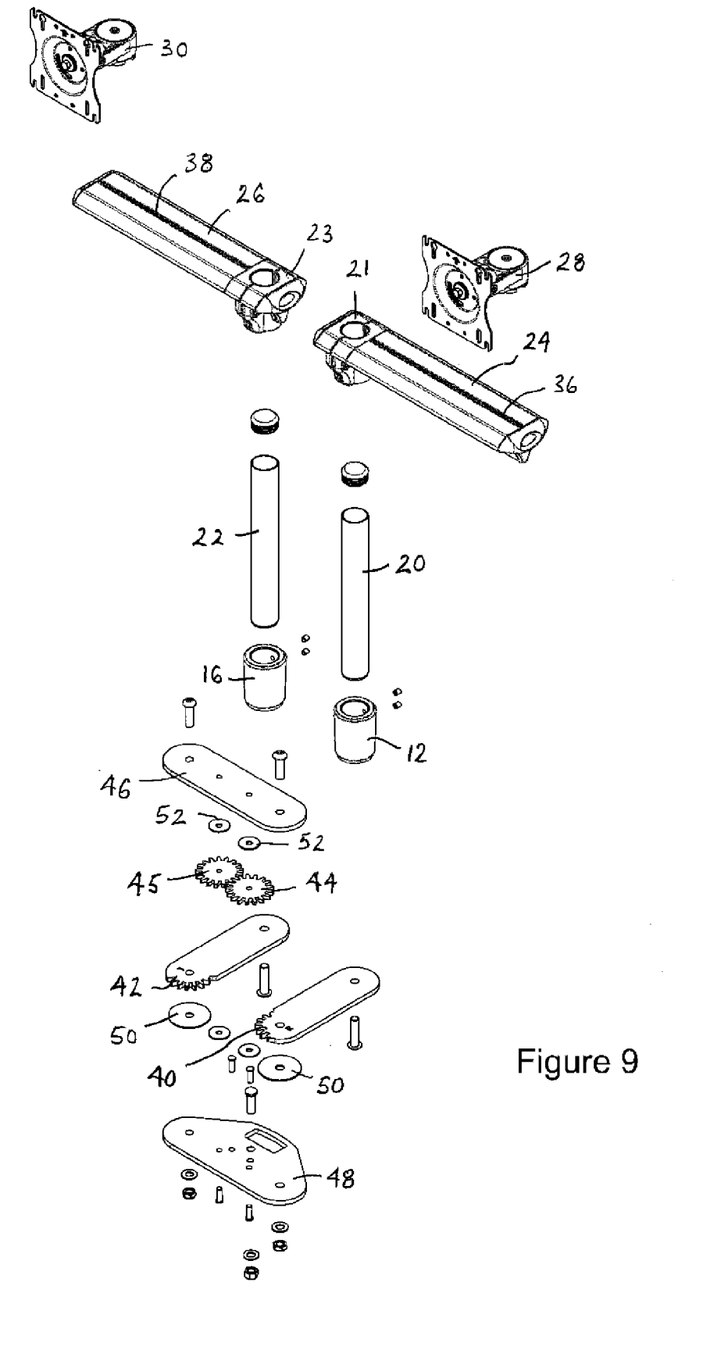
FIG. 9 is a partially exploded perspective view of the monitor support of FIG. 6.

FIG. 9 shows a partially exploded perspective view of the monitor support 2. The center section 6 of the base 4 has washers 50 located on either side of the gears 40, 42 of the end sections 8, 10, respectively, as well as washers 52 located on either side of the gears 44, 45. The base 4 includes fasteners, and pivot pins or shafts that pivotally connect the end sections 8, 10 and gears 44, 45 to the cover 46 and lower member 48 of the center section 6 of the base 4.

In operation, the monitor support 2 can be moved from the folded or storage position shown in FIG. 4 with the posts 20, 22 in the first and third positions, respectively, to an operating position, such as is shown in FIGS. 1-3 and 6-8, simply by applying force directly or indirectly in an appropriate direction to one of the end sections 8, 10, or posts 20, 22, which will cause the gears to interact to simultaneously pivot the other end section, simultaneously. Therefore, a user can move the monitors to the operating position, the folded position or any intermediate position, with one hand. While manual operation is preferred, a motor (not shown) operated through a remote (not shown) or by a controller on the support itself (not shown) can be connected to rotate one of the gears, thereby causing the remaining gears to rotate in a corresponding manner to move the monitor support between the operating and folded or storage positions.

The invention claimed is:

1. An assembly for mounting a first monitor and a second monitor, the assembly comprising:
   a base having a first end and a second end;
   a first arm comprising a first geared end and a first free end, the first arm connected to the first end of the base at the first geared end and rotatable relative to the base about a first axis extending perpendicular to the base;
   a second arm comprising a second geared end and a second free end, the second arm connected to the second end of the base at the second geared end and rotatable relative to the base about a second axis extending perpendicular to the base;
   a gear set mounted to the base and disposed intermediate the first arm and the second arm, the gear set engaging the first geared end and the second geared end;
   a first post mounted to the first free end of the first arm and having a first longitudinal axis that is generally parallel to the first axis;
   a second post mounted to the second free end of the second arm and having a second longitudinal axis that is generally parallel to the second axis;
   a first support arm movably mounted to the first post by a first clamp and having a first elongated channel extending in a direction generally transverse to the first longitudinal axis;
   a second support arm movably mounted to the second post by a second clamp and having a second elongated channel extending in a direction generally transverse to the second longitudinal axis;
   a first monitor mounting bracket connected to the first support arm at the first elongated channel and moveable along the first elongated channel;
   a second monitor mounting bracket connected to the second support arm at the second elongated channel and moveable along the second elongated channel; and
   wherein the first arm is rotatable relative to the base without relative movement between the first arm and the first support arm, and the second arm is rotatable relative to the base without relative movement between the second arm and the second support arm;
   wherein rotation of one of the first arm about the first axis between a first position and a second position and the second arm about the second axis between a third position and a fourth position drives rotation of the other of the first arm and the second arm between its respective positions; and
   wherein the first and second free ends move toward and away from each other as the first and second arms rotate between their respective positions.

2. The assembly of claim 1, wherein the first geared end includes a first set of gear teeth integrally formed on the first arm, and wherein the second geared end includes a second set of gear teeth integrally formed on the second arm.

3. The assembly of claim 2, wherein the gear set includes a pair of gears movably mounted on the base and meshingly engaging each other and the first and second sets of gear teeth.

4. The assembly of claim 1, wherein a position of the first support arm along the first longitudinal axis of the first post is adjustable.

5. The assembly of claim 4, wherein a position of the second support arm along the second longitudinal axis of the second post is adjustable independently of adjustment of the first support arm along the first longitudinal axis.

6. The assembly of claim 5, wherein a distance of the first monitor mounting bracket from the first post is adjustable independently of adjustment of a distance of the second monitor mounting bracket from the second post.

7. An assembly for mounting a first monitor and a second monitor, the assembly comprising:
- a base having a first end and a second end;
- a first arm comprising a first geared end, a first receptacle, and a first free end, the first arm connected to the first end of the base at the first geared end and rotatable relative to the base about a first axis extending perpendicular to the base, the first receptacle mounted at the first free end of the first arm and extending perpendicular therefrom;
- a second arm comprising a second geared end, a second receptacle, and a second free end, the second arm connected to the second end of the base at the second geared end and rotatable relative to the base about a second axis extending perpendicular to the base, the second receptacle mounted at the second free end of the second arm and extending perpendicular therefrom;
- a gear set mounted to the base and disposed intermediate the first arm and the second arm, the gear set engaging the first geared end and the second geared end;
- a first post received in the first receptacle mounted at the first free end of the first arm and having a first longitudinal axis that is generally parallel to the first axis;
- a second post received in the second receptacle mounted at the second free end of the second arm and having a second longitudinal axis that is generally parallel to the second axis;
- a first support arm movably mounted to the first post by a first clamp and having a first elongated channel extending in a direction generally transverse to the first longitudinal axis, the first support arm vertically adjustable along the first post independently of adjustment of the first post and the first arm;
- a second support arm movably mounted to the second post by a second clamp and having a second elongated channel extending in a direction generally transverse to the second longitudinal axis, the second support arm vertically adjustable along the second post independently of adjustment of the first and second arms and the second post;
- a first monitor mounting bracket connected to the first support arm at the first elongated channel and moveable along the first elongated channel;
- a second monitor mounting bracket connected to the second support arm at the second elongated channel and moveable along the second elongated channel; and
- wherein the first arm is rotatable relative to the base without relative movement between the first arm and the first support arm, and the second arm is rotatable relative to the base without relative movement between the second arm and the second support arm;
- wherein rotation of one of the first arm about the first axis between a first position and a second position and the second arm about the second axis between a third position and a fourth position drives rotation of the other of the first arm and the second arm between its respective positions; and
- wherein the first and second free ends move toward and away from each other as the first and second arms rotate between their respective positions.

8. The assembly of claim 7, wherein the first arm is rotatable relative to the base without relative movement between the first arm and the first support arm, and the second arm is rotatable relative to the base without relative movement between the second arm and the second support arm.

* * * * *

UNITED STATES PATENT AND TRADEMARK OFFICE
CERTIFICATE OF CORRECTION

PATENT NO. : 9,625,082 B2  
APPLICATION NO. : 14/057620  
DATED : April 18, 2017  
INVENTOR(S) : Nicholas Leonard Blackburn Page 1 of 1

It is certified that error appears in the above-identified patent and that said Letters Patent is hereby corrected as shown below:

On the Title Page (71) Applicant, delete "InterMetro Industries Corporation, Wilkes-Barre, PA (US)" and insert
-- TOUCHPOINT MEDICAL, INC., Concordville, PA (US) --

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*